United States Patent
Hamamoto

(10) Patent No.: US 6,832,597 B2
(45) Date of Patent: Dec. 21, 2004

(54) APPARATUS AND METHOD FOR CONTROLLING INTAKE SYSTEM IN ENGINE

(75) Inventor: Takayuki Hamamoto, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/425,979

(22) Filed: Apr. 30, 2003

(65) Prior Publication Data

US 2003/0226541 A1 Dec. 11, 2003

(30) Foreign Application Priority Data

May 2, 2002 (JP) ........................................ 2002-130606

(51) Int. Cl.[7] ................................................. F02D 1/00
(52) U.S. Cl. .............. 123/336; 123/184.26; 123/184.44
(58) Field of Search ........................... 123/336, 184.26, 123/184.36, 184.44, 184.49, 184.53, 184.55

(56) References Cited

U.S. PATENT DOCUMENTS

| | | | | |
|---|---|---|---|---|
| 4,538,556 A | * | 9/1985 | Takeda ................... | 123/184.57 |
| 4,671,217 A | * | 6/1987 | Hitomi et al. .......... | 123/184.44 |
| 4,679,531 A | * | 7/1987 | Hitomi et al. .......... | 123/184.42 |
| 4,722,307 A | * | 2/1988 | Okuno et al. ............ | 123/90.38 |
| 4,945,865 A | * | 8/1990 | Lee ......................... | 123/184.43 |
| 5,921,212 A | * | 7/1999 | Karlsson ................. | 123/184.47 |

FOREIGN PATENT DOCUMENTS

| | | |
|---|---|---|
| DE | 42 15 416 A1 | 11/1993 |
| DE | 195 31 985 A1 | 3/1997 |
| FR | 2 378 183 | 8/1978 |
| JP | 1-195913 A | 8/1989 |
| JP | 4-8304 Y2 | 3/1992 |
| JP | 2003-113718 A | 4/2003 |

* cited by examiner

*Primary Examiner*—John T. Kwon
(74) *Attorney, Agent, or Firm*—Foley & Lardner LLP

(57) ABSTRACT

A sub collector is connected to a main collector disposed downstream of a throttle valve in an intake passage and a control valve for collector capacity disposed between the two collectors controls connection therebetween. A difference in pressure between the two collectors is reduced when a condition that pressure in the sub collector is lower than a predetermined value in relation to pressure in the main collector occurs. Namely, the control valve is forcibly opened at a point from a fully closed position of the throttle valve to acceleration operation thereof.

12 Claims, 9 Drawing Sheets

APPARATUS AND METHOD FOR CONTROLLING INTAKE SYSTEM IN ENGINE

FIELD OF THE INVENTION

The present invention relates to an apparatus and a method for controlling an intake system in an engine.

BACKGROUND OF THE INVENTION

In an earlier V-type engine disclosed in a Japanese Examined Utility Publication No. 4-8304, a control valve is disposed in a partition wall that partitions connection between intake collectors on the banks of the engine wherein the control valve is opened when an engine rotation speed is more than a predetermined value, thereby enlarging a collector capacity per a single cylinder and improving an engine output at a fully opened position of a throttle valve during an intermediate- and high-rotation speed range of the engine.

SUMMARY OF THE INVENTION

An intake collector apparatus shown in a Japanese Unpublished Patent Application No. 2001-307122, in order to improve an engine output at a fully opening position of a throttle valve, has a main collector and a sub collector that is connected thereto through a control valve for collector capacity wherein the collector capacity varies by opening and closing the control valve corresponding to an engine rotation speed and as a result, both a torque response in a low-engine rotation speed range and an engine output at a fully opened position of a throttle valve in a high-engine rotation speed range are expected to improve.

However, in the above intake collector apparatus a pressure of the sub collector becomes lower than a pressure of the main collector depending upon an engine operation condition so that air introduced into the main collector through the throttle valve pulls in the sub collector, bringing in a large torque reduction and deterioration of an engine performance due thereto.

Namely, at a fully opened position of the throttle valve where the collector capacity is maximized by opening the control valve for the collector capacity, the throttle valve is controlled to become fully closed to suddenly stop a vehicle, and then, a little while later the control valve closes. At this moment the pressure of the main collector and the pressure of the sub collector are both negative. Afterwards, when the throttle valve opens for re-acceleration the pressure of the main collector increases and a little bit thereafter, the control valve opens. However, the negative pressure of the sub collector still remains larger compared with the pressure of the main collector and therefore, the air introduced into the main collector through the throttle valve pulls in the sub collector.

The present invention provides an apparatus and a method for controlling an intake system in an engine in order to solve the foregoing problems.

As one aspect of the present invention, a difference in pressure between a main collector and a sub collector is reduced when a condition that pressure in the sub collector relative to pressure in the main collector is lower than a predetermined value occurs.

The other aspects and features of this invention will become understood from the following description with accompanying drawings.

DETAILED DESCRIPTION OF THE PREFERRED EMBODIMENTS

Figure 1:
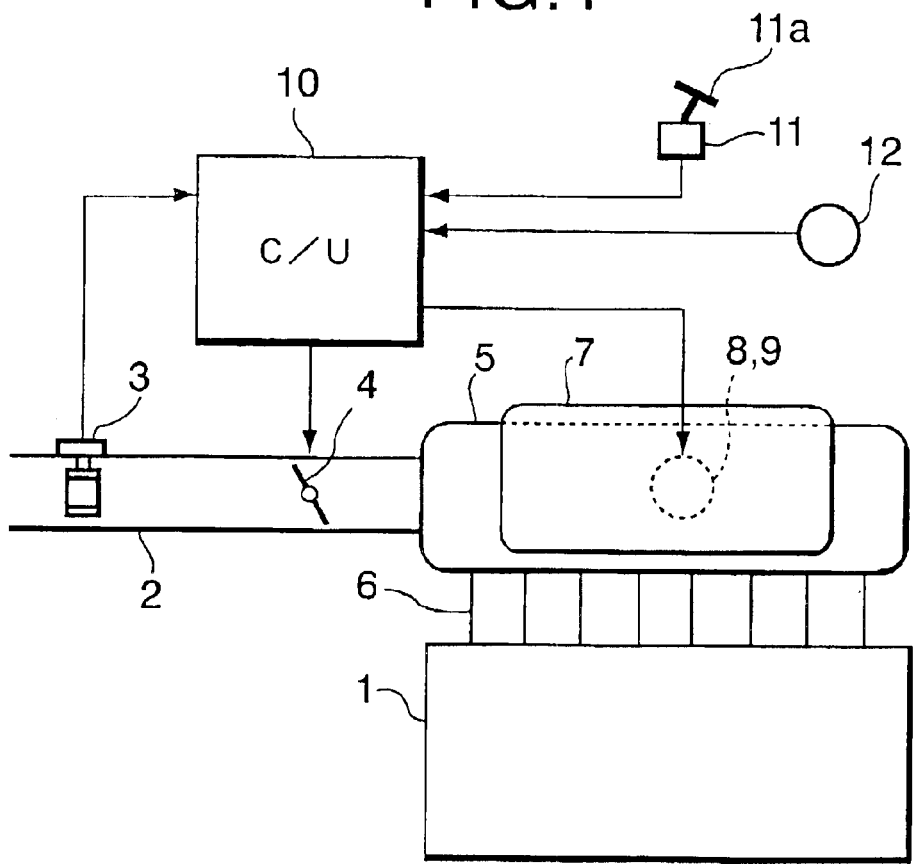
FIG. 1 is a schematic plan view of an engine intake system showing a first embodiment according to the invention.
Figure 2:
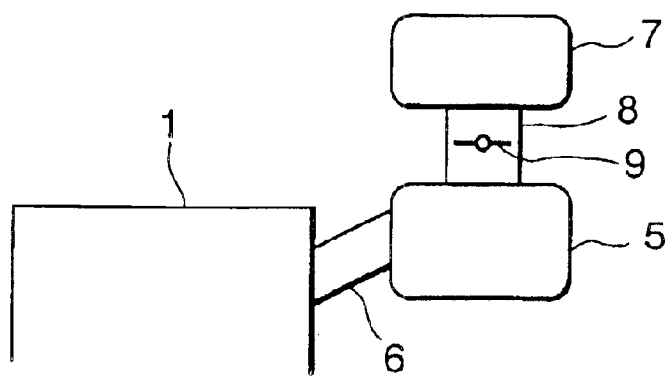
FIG. 2 is a partial side view of the engine intake system of the first embodiment.

The embodiments according to the invention will be explained with reference to the drawings. FIG. 1 is a schematic plan view of an engine intake system showing a first embodiment according to the invention and FIG. 2 is a partial side view thereof. The first embodiment is applied to a four-cylinder engine.

An air-flow meter 3 for intake air detection is disposed in an intake passage 2 of an engine 1 and an electrically controlled throttle valve 4 is disposed downstream thereof. A main collector 5 is disposed downstream of electrically controlled throttle valve 4 in intake passage 2 and a branch pipe 6 for each cylinder branched from main collector 5 is connected to an intake port inlet of each cylinder of engine 1. A sub collector 7 is disposed aside from main collector 5 and connected thereto through a connection pipe 8 in which a control valve 9 for collector capacity is disposed.

A control unit (controller) 10 for engine control receives signals from an opened angle sensor 11 for detecting an opened angle of an acceleration pedal (11a), a crank angle sensor 12 for detection of an engine rotation speed and so on other than air-flow meter 3. A throttle opened angle of electrically controlled valve 4 is controlled mainly based upon the opened angle of the acceleration pedal (11a) by controller 10 and when the acceleration pedal 11a is fully closed, the throttle valve 4 is also fully closed most of the time. Control valve 9 is controlled to open and close mainly based upon the engine rotation speed by controller 10.

Figure 3:
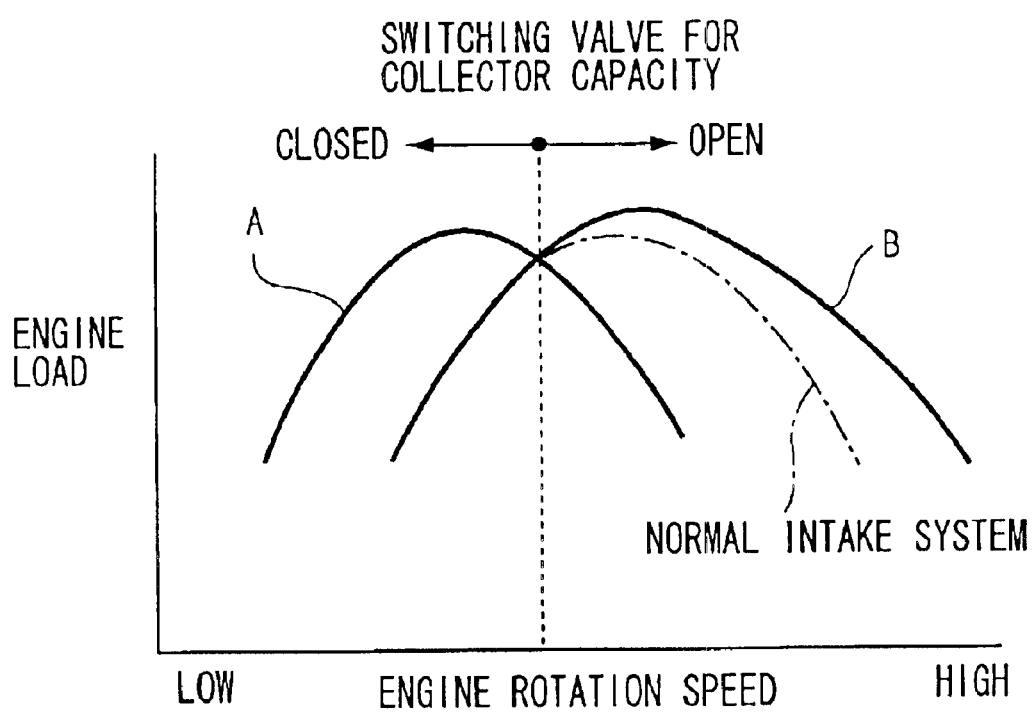
FIG. 3 is an engine output performance view corresponding to a collector with variable capacity.

Namely, in a low-engine rotation speed region (for example, in a region of less than 2800 rpm) control valve 9 is closed, and main collector 5 and sub collector 7 are disconnected. Thereby the collector capacity is reduced, bringing in improvement of a torque response, as well as an engine output due to a resonance charge (A in FIG. 3). In a high-engine rotation speed region, control valve 9 is opened, and main collector 5 and sub collector 7 are connected. Thereby the collector capacity is increased, bringing in improvement of an engine output at a fully opened position of throttle valve 4 due to an inertial effect (B in FIG. 3).

However, in the collector having variable capacity as described above, a pressure of sub collector 7 becomes lower than a pressure of main collector 5 depending upon an engine operation condition. Accordingly, when control valve 9 suddenly switches from a closed position to an opened position, air introduced into main collector 5 through throttle valve 4 pulls in sub collector 7, bringing in a large torque reduction and deterioration of an engine performance due thereto.

For example, the above problem takes place when an engine operation condition changes from acceleration (high load operation) through deceleration to re-acceleration).

Figure 5:
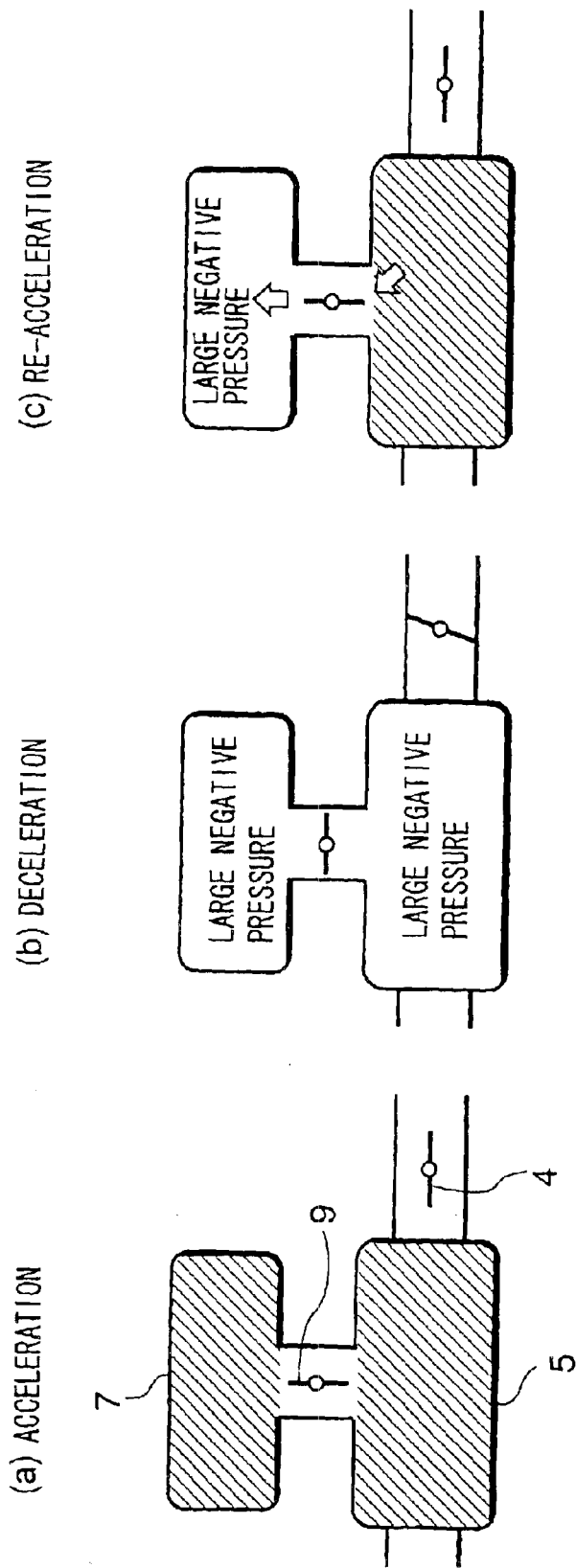
FIG. 5 is a view illustrating problems of the earlier technology.

During the first acceleration condition (high load operation), control valve 9 for collector capacity is opened due to a high-engine rotation speed region where, as shown in FIG. 5(a), a pressure of main collector 5 and a pressure of sub collector 7 are equal.

When the engine moves to deceleration by starting closing throttle valve 4, a little while later the engine moves to a predetermined-low rotation region. Thereby control valve 9 closes delayed by a small margin from closing timing of throttle valve 4. At this moment, as shown in FIG. 5(b), a pressure of main collector 5 becomes negative, but a pressure of sub collector 7 becomes negative before control valve 9 closes delayed.

Next, when throttle valve 4 opens and the engine moves to re-acceleration, the pressure of main collector 5 reduces. On the other hand, control valve 9 is controlled to open when the engine reaches a predetermined rotation speed as a threshold value and therefore, control valve 9 starts to open after the engine enters into a high rotation region. Since the pressure of sub collector 7 is kept negative until control valve 9 starts to open, as shown in FIG. 5(c), when control valve 9 fully opens for a moment, a difference in pressure between main collector 5 and sub collector 7 becomes large and a negative pressure of sub collector 7 is larger than that of main collector 5. Therefore, the air introduced into main collector 5 through throttle valve 4 pulls in sub collector 7, bringing in a big torque reduction and deterioration of an engine performance due thereto.

Figure 4:
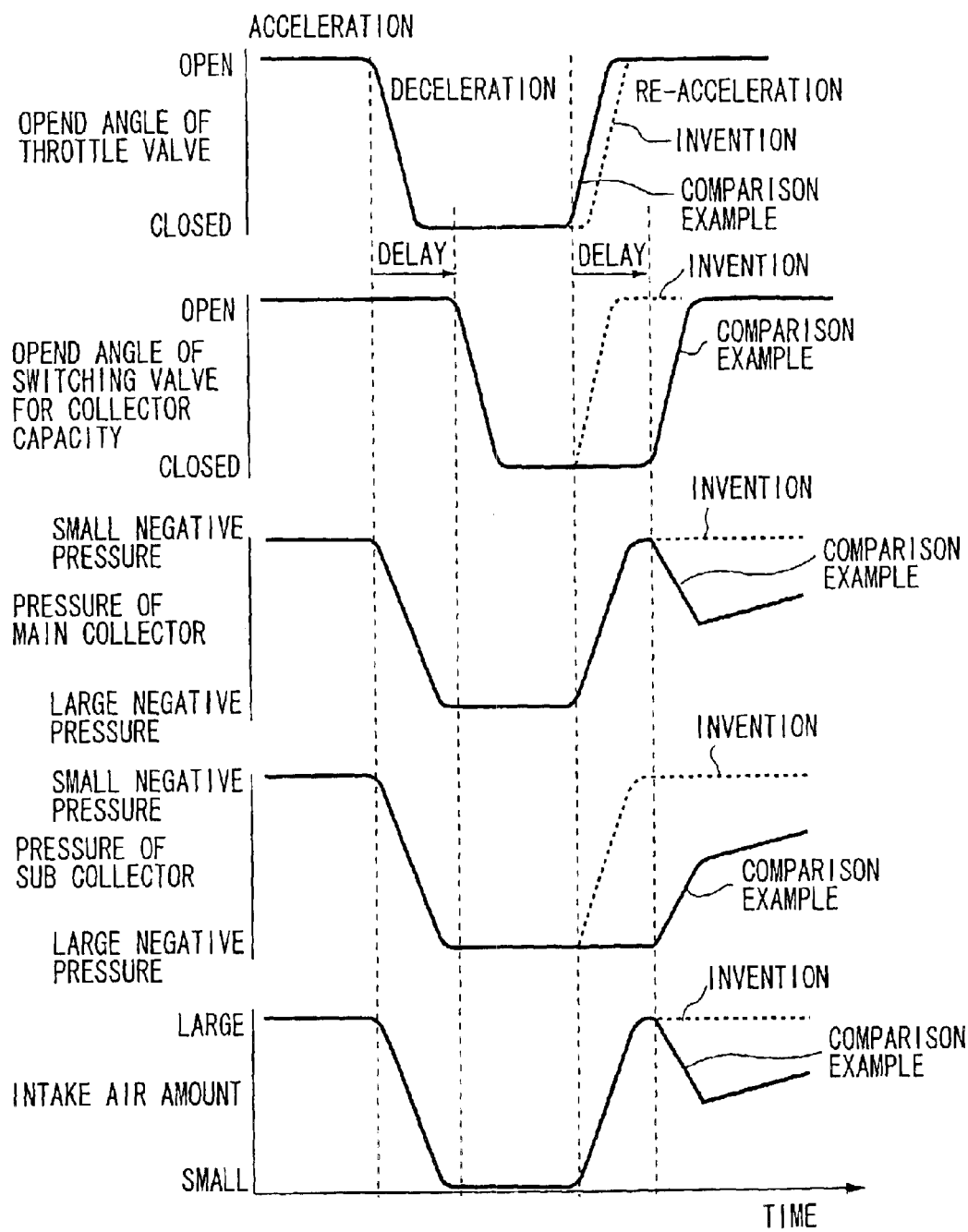
FIG. 4 is a time chart in acceleration, deceleration, and re-acceleration condition.

Namely, as described as a comparison example in FIG. 4, from a point when control valve 9 starts to open delayed from an opening start point of throttle valve 4, the negative pressure of main collector 5 temporarily increases and an intake air amount into the cylinder temporarily decreases, resulting in a big toque reduction.

Figure 6:
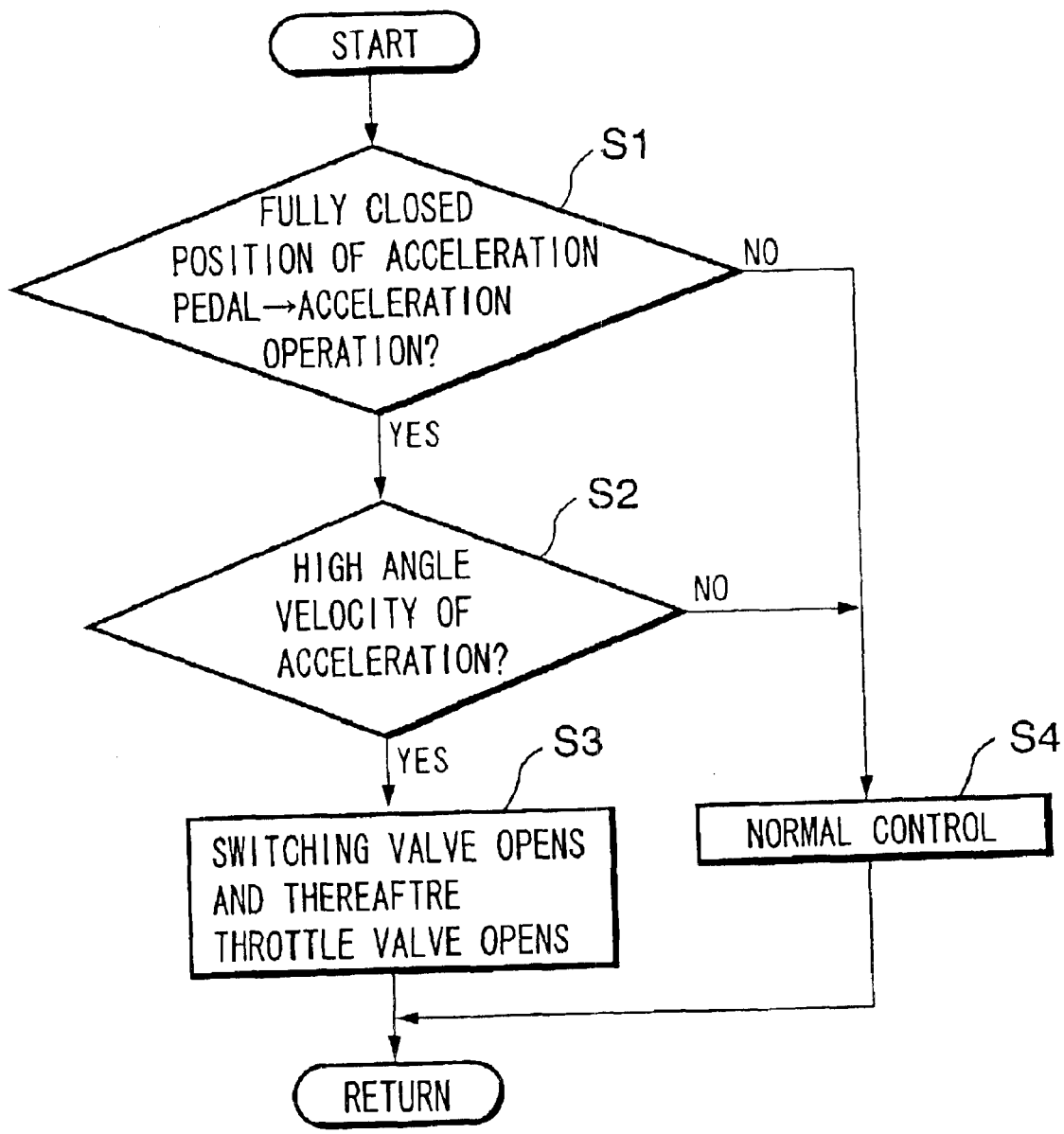
FIG. 6 is a flowchart in control of the first embodiment according to the invention.

Therefore, as one aspect of the present invention, a difference in pressure between a main collector and a sub collector is reduced to zero when a condition that pressure of a sub collector in relation to pressure of a main collector is lower than a predetermined value occurs. A flow chart of FIG. 6 shows estimation process of an occurrence of a condition that pressure of sub collector 7 decreases over a predetermined value. Control valve 9 is forcibly opened based upon the estimation.

When at S 1, an acceleration operation from a fully closed position of an acceleration pedal (11a) (namely, from a fully closed position of throttle valve 4) is detected, the process goes to S 2.

At S 2 it is judged whether or not an opened angle velocity of acceleration pedal (11a) (increase rate of acceleration-pedal-opening angle per unit time) is more than a predetermined value and when it is judged to be a rapid acceleration, namely it is estimated that the condition that the pressure of sub collector 7 is lower than a predetermined value in relation to the pressure of main collector 5 occurs, the process goes to S 3.

At S 3, control valve 9 opens and thereafter, electrically controlled throttle valve 4 opens. Namely, the pressure of main collector 5 and the pressure of sub collector 7 are equalized by opening control valve 9 before electrically controlled throttle valve 4 is opened.

According to the invention, as shown in FIG. 4, when the engine changes from acceleration condition through deceleration condition to re-acceleration condition, control valve 9 opens prior to the opening start point of throttle valve 4 at the re-acceleration condition, a negative pressure decrease of main collector 5 and a negative pressure decrease of sub collector 9 occurs simultaneously, thereby causing no difference in pressure between main collector 5 and sub collector 7. Therefore, reduction of intake air amount immediately after re-acceleration can be prevented and a torque reduction of engine 1 does not occur.

When at S 1, the acceleration operation from a fully closed position of an acceleration pedal (11a) is not detected, or when at S 2, the opened angle velocity of acceleration pedal (11a) is not more than a predetermined value, the pressure of sub collector 7 does not decrease over a predetermined value compared with the pressure of main collector 5. Accordingly the process goes to S 4 wherein a normal control is executed. Namely, an opened angle of electrically controlled throttle valve 4 is controlled based upon the opened angle of acceleration pedal (11a) and control valve 9 is controlled based upon the engine rotation speed.

In detail, control valve 9 is closed at a low-engine rotation speed region (less than 2800 rpm), thereby improving a torque response due to reducing collector capacity and a torque at a low-engine rotation speed due to a resonance charge. In a high-engine rotation speed region, control valve 9 is opened, thereby improving an engine output at a fully opened condition of acceleration pedal (11a) due to an inertial effect.

According to the embodiment, since a difference in pressure between main collector 5 and sub collector 7 is reduced to zero when an event that the pressure of sub collector 7 decreases over a predetermined value in relation to the pressure of main collector 5 occurs, a torque reduction is avoided by preventing the air introduced into main collector 5 from pulling in sub collector 7 and an engine performance improves.

According to the embodiment, when an occurrence of the condition that the pressure of sub collector 7 is lower than a predetermined value is estimated, control valve 9 is forcibly opened. Thereby no difference in pressure between main collector 5 and sub collector 7 is made and deterioration of an engine performance is prevented.

According to the embodiment, detecting an acceleration operation from a fully closed condition of acceleration pedal (11a) is estimated as the occurrence of the condition that the pressure of sub collector 7 is lower than a predetermined value, and thereby, no difference in pressure therebetween is made and deterioration of the engine performance can be prevented.

According to the invention, when the acceleration operation from a fully closed position of acceleration pedal (11a) is detected, throttle valve 4 is controlled to open after control valve 9 starts to open, thereby reducing a difference in pressure therebetween.

In the embodiment, operation allowance and operation order of throttle valve 4 and control valve 9 are integrally controlled based upon a predetermined condition and throttle valve 4 starts to open after control valve 9 is opened, but control valve 9 may be controlled to start to open substantially at the same time as throttle valve 4 opens.

According to the embodiment, during a normal engine operation condition, control valve 9 closes in a low-engine rotation speed range and opens in a high-engine rotation speed range. Therefore, a torque response in a low-engine rotation speed range and an engine output at a fully opened position of acceleration pedal (11a) can be improved.

Figure 7:
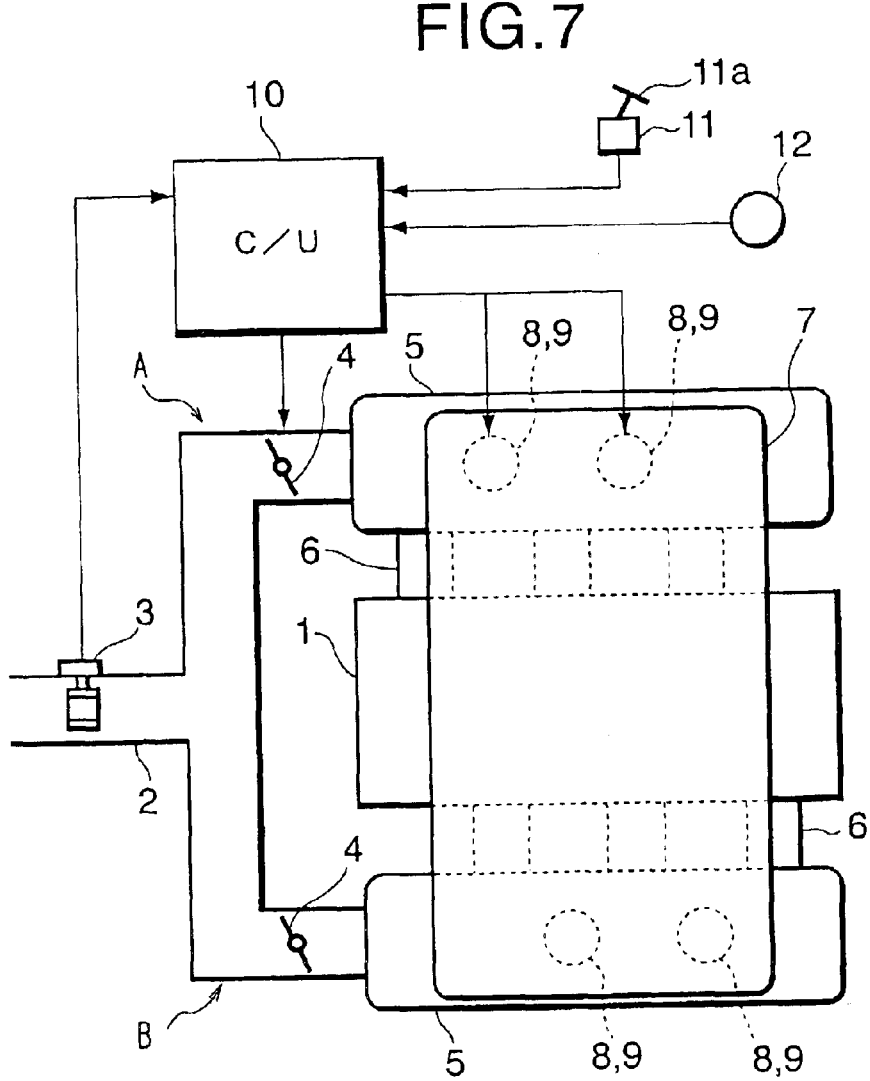
FIG. 7 is a schematic plan view of a second embodiment according to the invention.
Figure 8:
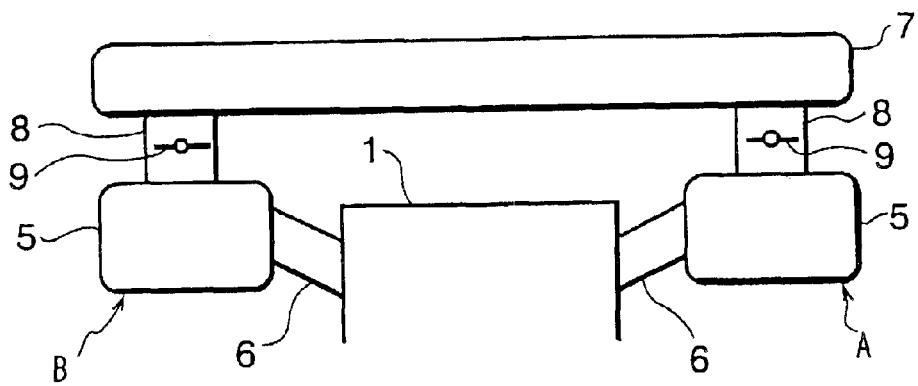
FIG. 8 is a partial side view of the engine intake system of the second embodiment.

A second embodiment according to the invention will be explained. FIG. 7 is a schematic plan view of an engine intake system showing a second embodiment according to the invention. FIG. 8 is a partial side view thereof. The embodiment is applied to a V-type-six-cylinder engine.

An air-flow meter 3 for intake air detection is disposed in an intake passage 2 of an engine 1 and intake passage 2 is branched into two systems (A, B) downstream of air-flow meter 3. An electrically controlled throttle valve 4 is disposed respectively in the two branched systems downstream thereof. A main collector 5 is respectively disposed downstream of each electrically controlled throttle valve 4 and a branch pipe 6 for each cylinder branched from each main collector 5 is connected to an intake port inlet of each cylinder of engine 1. A common sub collector 7 is disposed aside from main collector 5 and connected thereto through a plurality of connection pipes 8 in each of which a control valve 9 for collector capacity is disposed that opens and closes each connection pipe 8.

With this arrangement, the second embodiment has the same effect as the first embodiment when controlled in the same way as the first embodiment.

Figure 9:
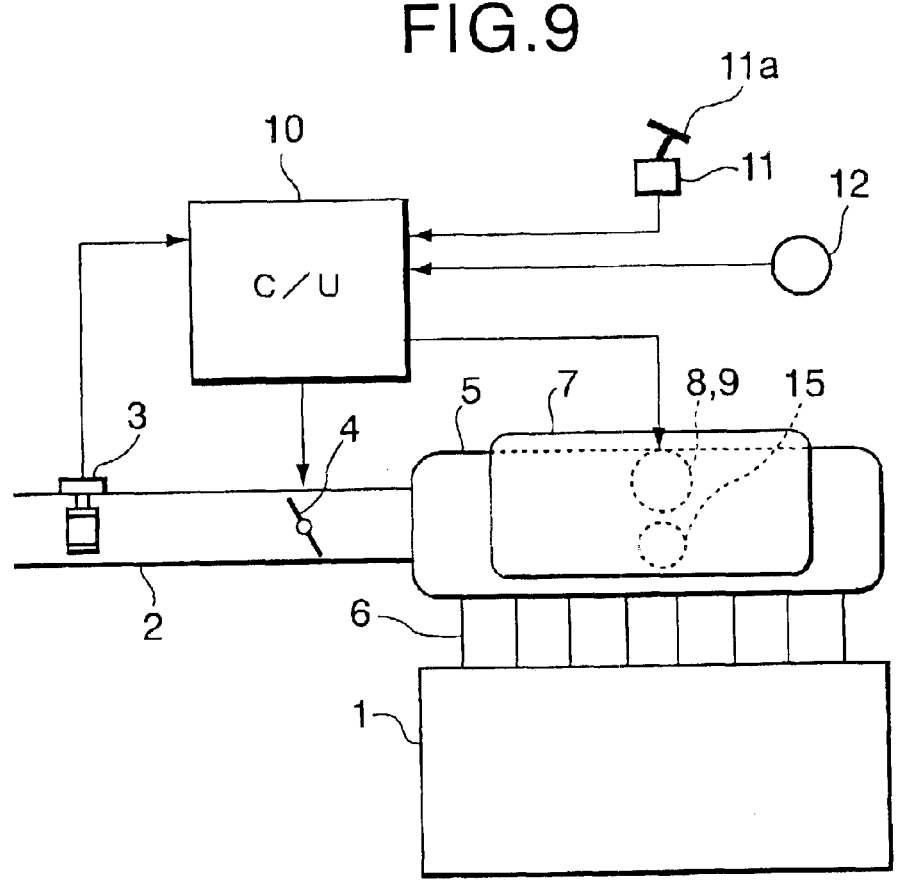
FIG. 9 is a schematic plan view of an engine intake system of a third embodiment according to the invention.
Figure 10:
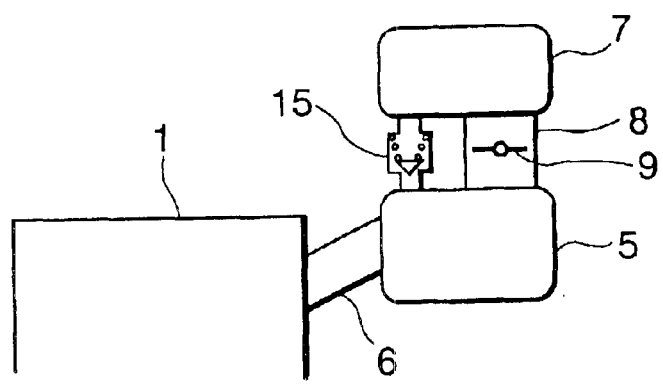
FIG. 10 is a partial side view of the engine intake system of the third embodiment.

A third embodiment according to the invention will be explained. FIG. 9 is a schematic plan view of an engine intake system showing a third embodiment according to the invention. FIG. 10 is a partial side view thereof. The embodiment is applied to a four-cylinder engine. The third embodiment differs in that a main collector 5 and a sub collector 7 are also connected by a one-way valve 15 that allows air flow only in the direction of from main collector 5 to sub collector 7 from the first embodiment.

One-way valve 15 connects sub collector 7 to main collector 5 when a condition that pressure of sub collector 7 is lower than a predetermined value compared with pressure of main collector 5 occurs.

Figure 11:
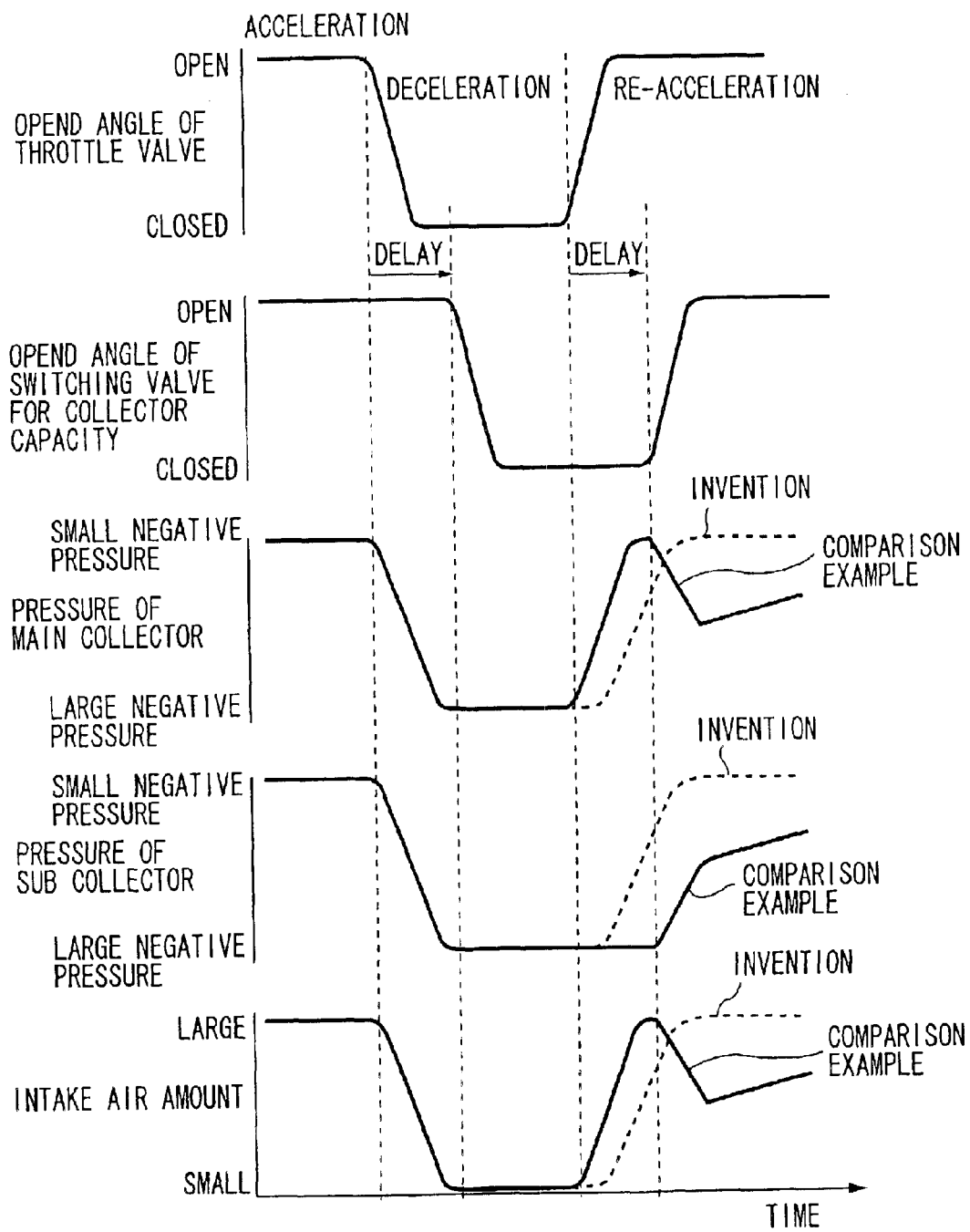
FIG. 11 is a time chart in acceleration, deceleration, and re-acceleration condition.

As shown in FIG. 11, when the engine changes from acceleration condition (heavy load operation condition) through deceleration to re-acceleration, the engine is still in a low rotation region at a starting point of opening throttle valve 4 and a control valve 9 does not open yet.

Therefore, upsurge pressure of main collector 5 has effect of causing a pressure difference between the two collectors, but in the embodiment the pressure of sub collector 7 increases the same as the pressure of main collector 5 due to one-way valve 15 being opened.

As a result, even when control valve 9 opens after throttle valve 4 has opened (after changing into high-engine rotation speed region), the negative pressure of sub collector 7 reduces in the same way as the negative pressure of main collector 5 as shown in FIG. 11 and the pressure difference between main collector 5 and sub collector 7 does not occur. Accordingly, reduction of an intake air amount immediately after re-acceleration is avoided and as a result, a torque reduction of the engine is prevented.

In particular, according to the embodiment, since main collector 5 and sub collector 7 are connected by one-way valve 15, when the pressure of main collector 5 increases by opening throttle valve 4 at re-acceleration, the pressure of sub collector 7 increases due to operation of one-way valve 15. Therefore, a difference in pressure therebetween at a starting point of opening control valve 9 is reduced to zero and deterioration of an engine performance is avoided.

Figure 12:
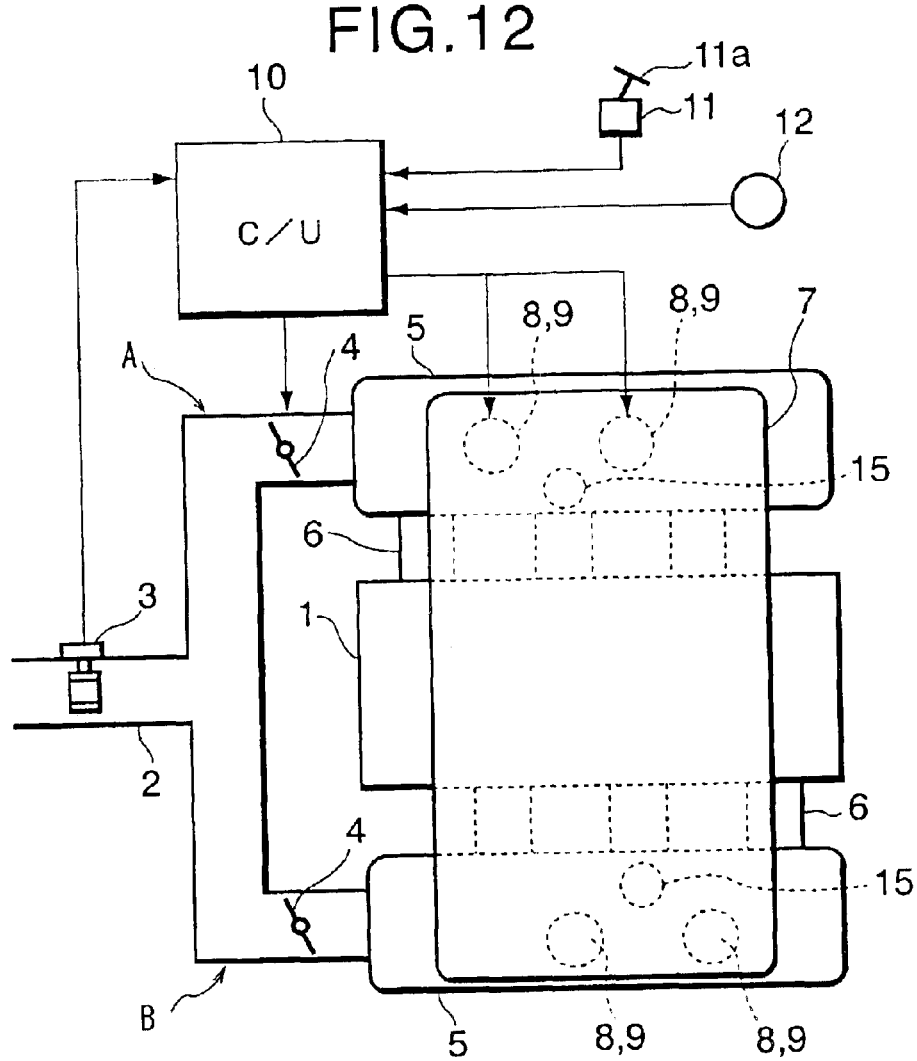
FIG. 12 is a schematic plan view of an engine intake system of a fourth embodiment according to the invention.
Figure 13:
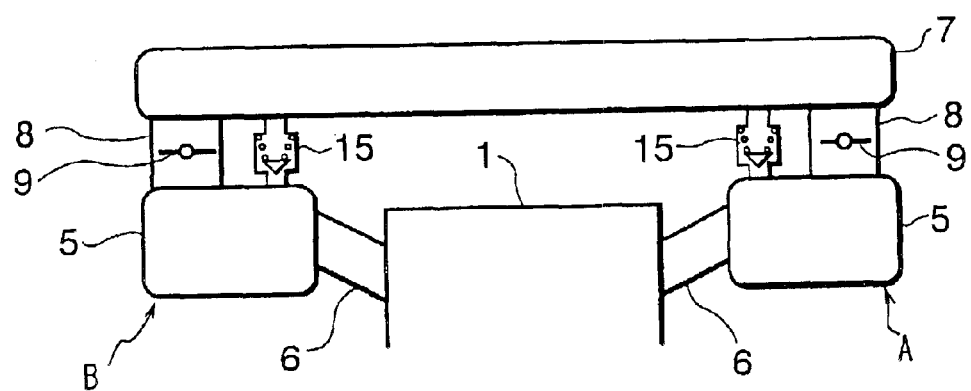
FIG. 13 is a partial side view of the engine intake system of the fourth embodiment.

A fourth embodiment according to the invention will be explained. FIG. 12 is a schematic plan view of an engine intake system of a fourth embodiment according to the invention. FIG. 13 is a partial side view thereof. The embodiment is applied to a V-type-six-cylinder engine.

The fourth embodiment differs in that each main collector 5 and a sub collector 7 are also connected by a one-way valve 15 that allows air flow only in the direction from each main collector 5 to sub collector 7 from the second embodiment.

With this arrangement, the fourth embodiment has the same effect as the third embodiment by adding one-way valve 15.

This application claims priority to Japanese Patent Application No. 2002-130606 filed May 2, 2002. The entire disclosure of Japanese Patent Application No. 2002-130606 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention is provided for illustration only, and not for the purpose of limiting the invention as defined by the appended claims and their equivalents. Moreover, features of the different embodiments may be combined.

What is claimed:

1. An apparatus for controlling an intake system of engine comprising:

a throttle valve disposed in an intake passage of the engine;

a main collector disposed downstream of the throttle valve in the intake passage;

a sub collector connected to the main collector;

a control valve arranged between the main collector and the sub collector so as to control an effective collector volume based upon an engine operation condition; and a controller that reduces a difference in pressure between the main collector and the sub collector when a condition that pressure in the sub collector relative to pressure in the main collector is lower than a predetermined value occurs.

2. An apparatus as claimed in claim 1, wherein the controller reduces the difference in pressure between the main collector and the sub collector by forcibly opening the control valve.

3. An apparatus as claimed in claim 2, wherein the controller forcibly opens the control valve when an acceleration condition from a closed position of an acceleration pedal is established.

4. An apparatus as claimed in claim 3, wherein the throttle valve is opened after the controller forcibly opens the control valve.

5. An apparatus as claimed in claim 1, wherein the control valve is closed in a low engine rotation region and is opened in a high engine rotation region.

6. A method for controlling an intake system of an engine comprising, the intake system comprising a throttle valve disposed in an intake passage of the engine, a main collector disposed downstream of the throttle valve in the intake passage; a sub collector connected to the main collector, and a control valve arranged between the main collector and the sub collector so as to control an effective collector volume, the method comprising:

controlling the control valve in accordance with an engine rotation speed, wherein the control valve is at a closed position when the engine is in a low engine rotation region and is at an opened position when the engine is in a high engine rotation region; and reducing a difference in pressure between the main collector and the sub collector when pressure in the sub collector is low relative to pressure in the main collector by forcibly opening the control valve.

7. A method as claimed in claim 6, wherein the control valve is forcibly opened when an acceleration condition from a closed position of an acceleration pedal is established.

8. A method as claimed in claim 7, wherein the throttle valve is opened after the control valve is forcibly opened.

9. An apparatus for controlling an intake system of engine comprising:

a throttle valve disposed in an intake passage of the engine;

a main collector disposed downstream of the throttle valve in the intake passage;

a sub collector connected to the main collector;

a control valve arranged between the main collector and the sub collector, the control valve being controlled at a closed position when the engine is in a low engine rotation region and being controlled at an opened position when the engine is in a high engine rotation region; and a controller that forcibly opens the control valve when an acceleration condition from a closed position of an acceleration pedal is established.

10. The apparatus of claim 1, further comprising:

a one-way valve arranged between the main collector and the sub collector, the one-way valve allowing air flow only in a direction from the main collector to the sub collector.

11. The apparatus of claim 9, further comprising:

a one-way valve arranged between the main collector and the sub collector, the one-way valve allowing air flow only in a direction from the main collector to the sub collector.

12. The method of claim 6, further comprising:

reducing a difference in pressure between the main collector and the sub collector when pressure in the sub collector is lower relative to pressure in the main by opening a one way valve that allows air flow only in a direction from the main collector to the sub collector.

* * * * *